Nov. 17, 1953 E. J. OTKEN 2,659,503
CONFECTION FEEDING AND RELEASING MACHINE
Filed March 12, 1952 4 Sheets-Sheet 1

INVENTOR.
BY Edwin J. Otken
Robb & Robb,
Attorneys

Nov. 17, 1953 E. J. OTKEN 2,659,503
CONFECTION FEEDING AND RELEASING MACHINE
Filed March 12, 1952 4 Sheets-Sheet 2

INVENTOR.
Edwin J. Otken
BY Robb & Robb
Attorneys

Nov. 17, 1953  E. J. OTKEN  2,659,503
CONFECTION FEEDING AND RELEASING MACHINE
Filed March 12, 1952  4 Sheets-Sheet 3

INVENTOR.
Edwin J. Otken
BY Robb & Robb
Attorneys

Nov. 17, 1953  E. J. OTKEN  2,659,503
CONFECTION FEEDING AND RELEASING MACHINE
Filed March 12, 1952  4 Sheets-Sheet 4
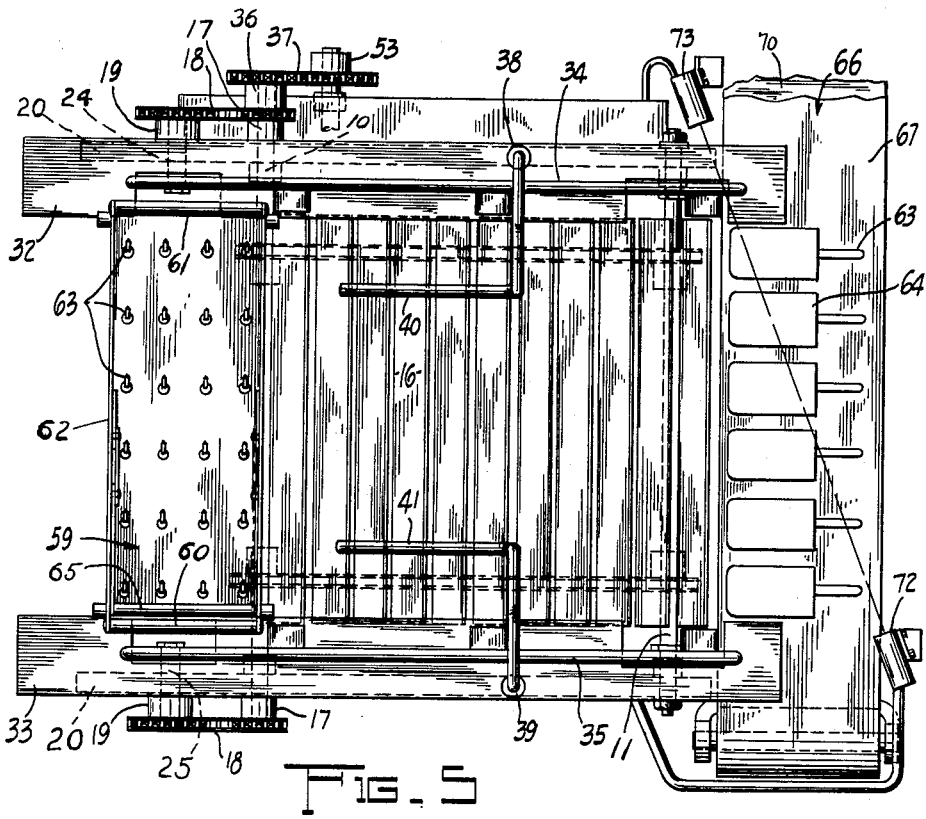
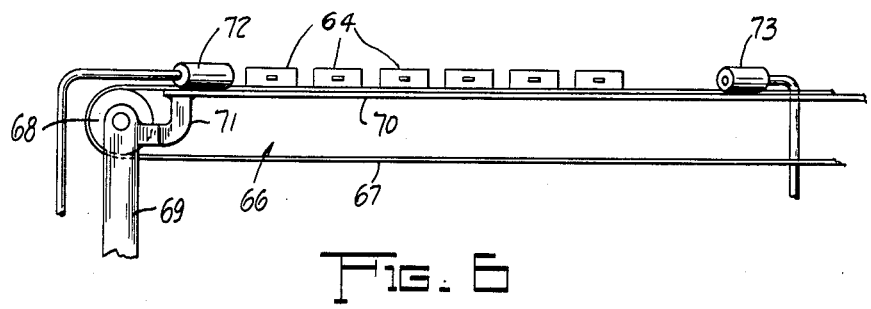
INVENTOR.
Edwin J. Otken
BY Robb & Robb
Attorneys

UNITED STATES PATENT OFFICE 2,659,503

CONFECTION FEEDING AND RELEASING MACHINE

Edwin J. Otken, New Brunswick, N. J., assignor to Good Humor Corporation, Brooklyn, N. Y., a corporation Application March 12, 1952, Serial No. 276,096

11 Claims. (Cl. 214—300)

This invention generally relates to a feeding and releasing machine of a type adapted to handle and convey groups of articles after initial manufacturing processes have been performed, for continuous delivery of individual articles to a wrapping or bagging machine with which the same may be associated.

More particularly this invention relates to confection feeding and releasing mechanism, and to a complete machine in which such mechanism is incorporated.

In the art of manufacture of confections, and more particularly the manufacture of what is known as frozen confections, for various reasons including the desirability of maintaining such manufacture under the most sanitary conditions, and to speed up the same in order to reduce the cost and make the same more widely available, it has been found that the wrapping or packaging of these confections requires a great deal of hand labor, and as a result the desirability of a machine such as is contemplated by this invention will be readily apparent.

In the handling of frozen confections after their initial manufacture, the same are ordinarily transported during such manufacturing operation by wooden sticks or other handle means which are incorporated into the confection itself, which handle means serve as devices for maintaining a group of the confections in what is called a stickholder in the art. The confections are maintained in connection with the stickholder, and may be released therefrom in accordance with known practice when desired.

It is accordingly an object of this invention, to facilitate the releasing of the frozen confections from a stickholder or the like, and the subsequent positioning of the same for delivery to suitable mechanism, which in turn so supplies the confections to a wrapping or other type of machine as to materially speed up the said wrapping or other sanitary covering to be effected for the confection.

It is a further object of this invention to provide a machine in which the stick holders having the frozen confections depending therefrom may be inserted, and thereafter by automatic operation the said stickholders may pass through the machine, releasing of the confections supported by the stickholder being effected during such movement, and thereafter the confection may be delivered to a conveyor belt or the like, to be subsequently fed into the wrapping or bagging machine as the case may be.

It is a further object of this invention, to arrange the various components of the feeding and releasing mechanism whereby the confections supported in the stickholder may be released therefrom, and subsequently delivered in a step-by-step operation so as to maintain a continuous flow of confections to the wrapping or bagging machine.

It is a still object of this invention to so arrange the various parts of the mechanism which effect the releasing and feeding of the confections, as to provide a substantially automatic and continuous supply of confections for subsequent manipulation, all of the same being accomplished in large measure without the necessity for manual manipulation of any of the parts of the mechanism.

It is a still further object of this invention to provide a simple compact structure upon or into which the stickholder having the frozen confections supported thereby may be fed, and by suitable timing arrangement feed the said stickholder in a step-by-step manner, thereafter effecting a release of the confections so as to rest in a guided position upon additional mechanism, and to subsequently deposit the said confections into a different position from that which they occupied preliminarily and after the release thereof, all of the same being effected for the purposes of providing a continuous flow of the confections, although the actuation of the component parts of the feeding and releasing mechanism itself is carried out in a step-by-step manner.

Another object of this invention is to provide a feeding and releasing mechanism comprised of a pair of conveyor units, one located above the other, the upper conveyor unit being provided with means for feeding a stickholder or the like, with the confections thereon from one end of the conveyor to the other, and during such movement effect a release of the confections into positions wherein they rest and depend for support on the lower conveyor unit, the said conveyor units being operated in timed relation, and when the confections have been moved by the conveyor units to their farthest extent, to so change the positions of the confections upon discharge from the conveyor unit, to rest in substantially different positions from those they originally occupied.

It is a still further object of this invention to arrange the various parts of the mechanism so that the same are simple and accessible and yet will carry out the objects hereof to the best advantage.

Other and further objects of this invention will be apparent upon a consideration of the specification, and set forth in the drawings appended hereto, wherein:

Figure 5 is a top plan view of the machine showing the general arrangement of the parts thereof with a stickholder in place, and further illustrating the carry-off conveyor belt onto which the confections are discharged after passing through the machine.

Figure 6 is a view looking toward the left in Figure 5 showing the arrangement of certain of the control instrumentalities and the conveyor belt onto which the confections are discharged after passing through the machine.

Figure 1:
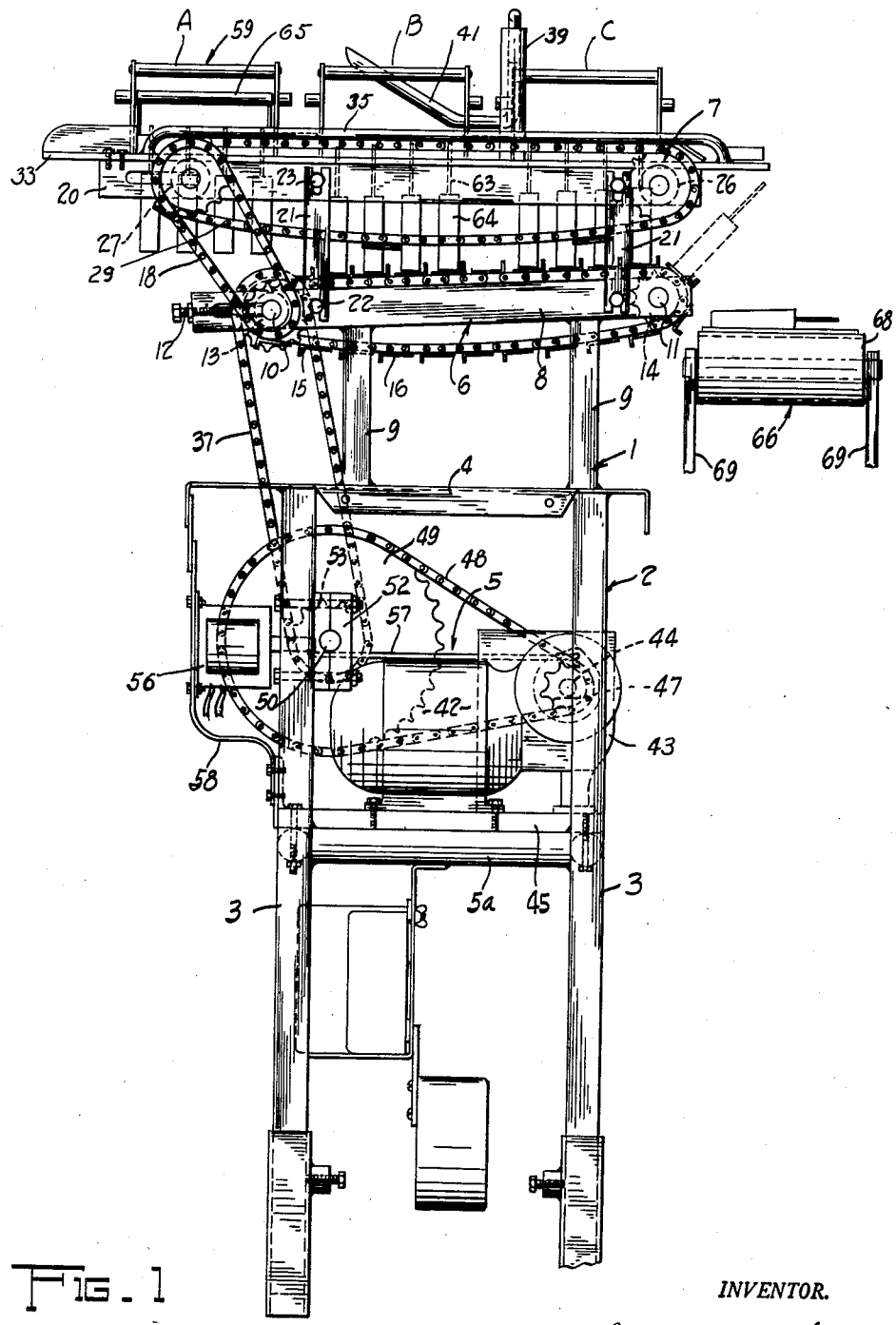
Figure 1 is a side elevation of the machine of this invention, disclosing the arrangement of the conveyors upon a main supporting framework, and the various means for driving said conveyors.
Figure 2:
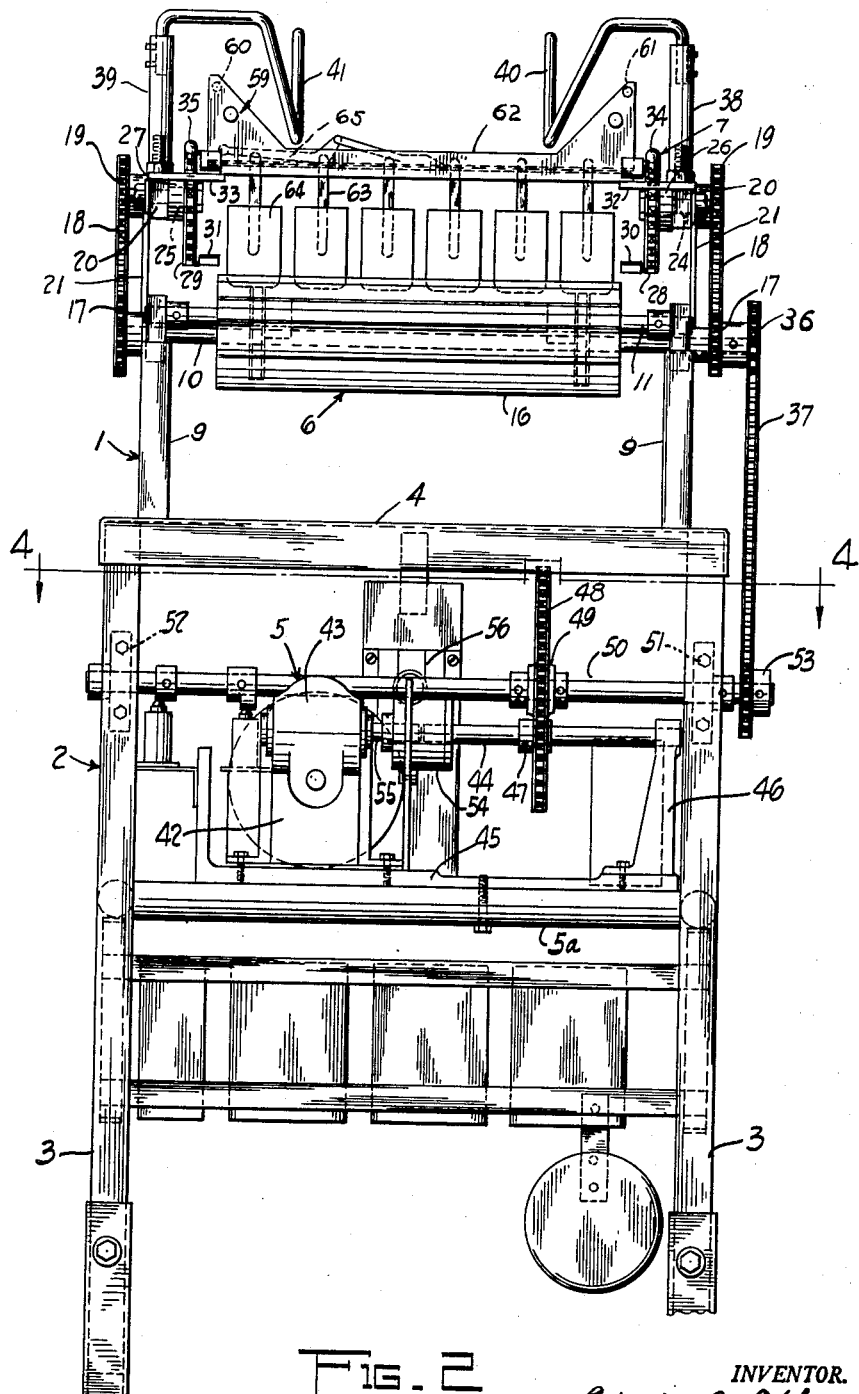
Figure 2 is an end view of the machine looking toward the discharge end thereof, further illustrating the arrangement of the various components including the driving means for operating the said conveyors in timed relation.
Figure 3:
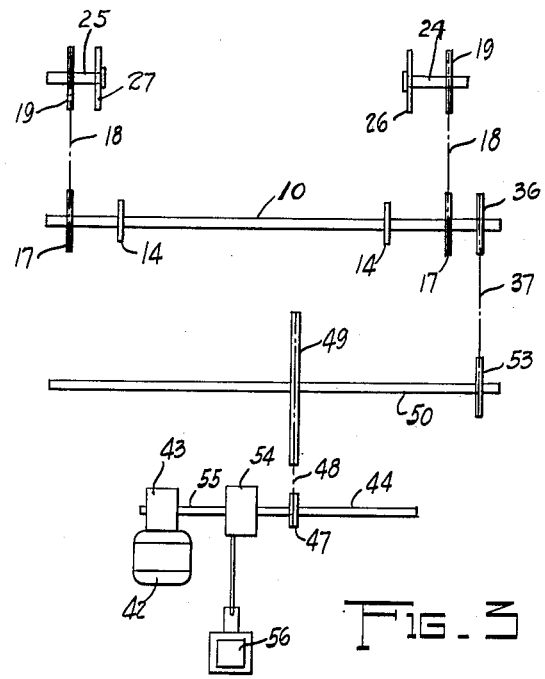
Figure 3 is a diagrammatic view illustrating the manner of driving the various instrumentalities, the same being shown in a generally schematic manner.

Referring now to Figures 1 and 2, a support generally designated 1, is made up of a lower section 2, the lower section 2 including suitable upright members 3. Welded or otherwise secured thereto members 4 and 5a, thus form a rigid substantially rectangular structure. Within the lower frame unit 2, are located suitable operating instrumentalities and control means therefor, generally designated 5, which will be described hereinafter.

Supported above the lower unit 2 is a lower conveying or supporting and moving unit generally designated 6, and an upper conveying and supporting unit generally designated 7, the details of which will be more specifically referred to and described. The lower conveying and supporting unit 6 comprises a pair of side rails 8, welded or otherwise secured at a slight angle with respect to the top of the lower supporting frame 2, upon the angle members designated 9. At opposite ends of the side rails 8, are suitable bearings, in which are mounted the cross shafts 10 and 11 respectively. The cross shaft 10 is adapted to be adjusted toward and from the cross shaft 11 by means of a suitable adjusting screw arrangement 12, for purposes which will hereinafter appear. The cross shafts 10 and 11 are fitted near the bearing supports with suitable sprockets designated 13 and 14 respectively, which sprockets are of special conformation and in turn support thereon the endless chain structure designated 15, the said endless chain structure 15 being made up of alternate links having a ⅝ pitch and a 1″ pitch. It will be understood that every other link in the chain is of ⅝ pitch and the intermediate link of course is a 1″ pitch link for purposes which will be understood during further explanation of the invention.

In view of the fact that the special sprockets upon which the chains according to the description above set forth, are mounted, are of course fixed to the shafts 10 and 11, it will be apparent that movement of the special chains 15 therearound will be uniform and in unison. Suitably fastened in any preferred manner near the ends, are the confection supporting members designated 16, the same being formed of a relatively wide flat base portion which is fastened to the long links above referred to, and having extending upwardly therefrom as viewed from the side of the conveyor shown in Figure 1, are the angular portions formed integrally with the flat portions. The foregoing arrangement provides what is in effect a flat flexible belt, having individual portions or supporting members 16 comprising the same, and adapted to be moved continuously or intermittently as the case may be around the sprockets 13 and 14.

Suitably fastened at the outer ends of the shaft 10 are the upper conveyor operating sprockets 17 (see Figure 2) which sprockets 17 engage suitable chains 18 for operating the upper conveyor or supporting unit previously referred to as generally designated 7. The chains 18 are engaged and are adapted to rotate suitable sprockets 19 for operating the upper conveyor chains in a manner to be now described.

The upper conveying and supporting unit 7 consists of a pair of side rails designated 20 located above and substantially parallel to the side rails 8 of the lower conveyor unit, and are supported thereabove by means of the slotted members 21, which slotted members 21 are fastened at their lower ends to the side rails 8 by means of suitable bolts 22, being correspondingly fastened at their upper ends to the side rails 20 by means of bolts 23. The purpose of the slotted rails 21 is to provide for suitable adjustment, both upwardly and downwardly of the rails 20, and thus of course the unit 7, of which the said rails are a part, and also to permit limited horizontal adjustment of the said conveyor unit 7 as required in accordance with the desired characteristics to be attained by the use of this invention.

The side rails 20 are provided with bearing portions for the stub shafts 24 and 25 being located at opposite ends substantially speaking of the side rails 20, which stub shafts support inwardly of the side rails 20 sprockets 26 and 27. The sprockets 26 and 27 in turn are provided with special chain structures, one chain for each pair of sprockets at opposite sides of the machine as shown in Figure 2, said chains being designated 28 and 29 respectively. These special chains 28 and 29 are comprised of a series of ⅝ pitch links, every thirteenth link thereof being provided with an offstanding arm designated 30 for the chain denoted 28 and 31 for the chain denoted 29, the purposes of these arms to be subsequently referred to and explained.

Suitably fastened along the upper edges of the side rails 20 of the conveyor unit 7 are the flat supporting plates 32 and 33, the same being constructed so as to permit the chains with the arms thereon, to pass upwardly along and above the upper surfaces thereof and beneath chain retainer guide rods designated 34 and 35 for the respective flat supporting plates 32 and 33. The purpose of these retainer guide rods is to maintain the respective chains in proper alignment and prevent any possible slippage of the same with respect to the sprockets upon which they are supported.

The shaft 10, as seen in Figure 2 extends beyond the sprocket 17 mounted thereon and is equipped with a sprocket 36 fixed thereto, which is in turn provided with an endless chain 37 extending downwardly by which the conveyor units 6 and 7 are driven in a manner to be described.

For reasons which will hereinafter appear, it is pertinent to point out that the sprockets 13 and 14 previously mentioned as being special sprockets, are special 4-tooth sprockets. In turn it should be noted that sprockets 17 are 12-tooth sprockets, the chains 18 engaged therewith, in turn being engaged with 15-tooth sprockets 19. Additionally it should be mentioned that the sprockets 26 and 27 over which the chains 28 and 29 are mounted are 13-tooth sprockets, all of the foregoing being so arranged as to compel timed and simultaneously timed operation of the respective conveyor units 6 and 7. The exact reason for this particular relationship will be understood during a description of the operation of the machine which will be subsequently set forth.

Suitably mounted on the support 1 by means of the posts 38 and 39, the same being suitably fastened to the supporting plates 32 and 33 respectively, are the releasing members 40 and 41. These releasing members 40 and 41 are in the form of rods bent in the manner shown in Figures 1 and 2, so as to provide cam member or members whose operation will be referred to subsequently.

Figure 4:
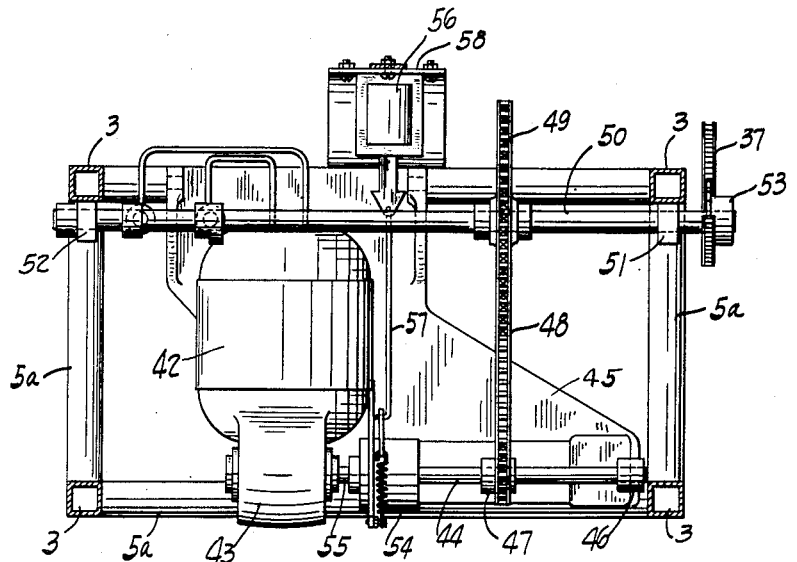
Figure 4 is a view taken about on the line 4—4 of Figure 2 looking in the direction of the arrows, and further disclosing certain of the operating instrumentalities for the mechanism.

Referring now to Figures 1, 2 and 4 particularly, it will be noted that the operating and controlling instrumentalities generally designated 5, comprise an electric motor 42 of any conventional construction, and having suitably fastened thereto and driven thereby geared head unit 43, which is connected to a countershaft 44, which countershaft 44 extends at right angles to the motor, as permitted by the geared head 43 fastened to the motor 42. The motor 42 is mounted on a suitable platform 45, which is fastened in any preferred manner to the cross members 5a of the lower frame unit 2.

The countershaft 44 is supported at one end by the geared head 43, and at the other end a suitable bearing member 46 extending upwardly from the platform 45 is provided to maintain such countershaft 44 in operating position. Intermediate the bearing member 46 and the connection of the shaft 44 with the geared head 43, there is provided a 12-tooth sprocket member 47, fixed to the shaft 44 over which a suitable endless chain 48 is adapted to operate, the chain 48 in turn engaging a 60-tooth sprocket 49. The sprocket 49 is fixed to a shaft 50, the said shaft 50 being supported in bearings 51 and 52, fastened to the upright member 3 of the lower supporting unit 2 in any preferred manner. The shaft 50 extends outwardly beyond the lower frame or supporting unit 2 and is provided at its outer end with a 15-tooth sprocket 53, suitably non-rotatively fastened thereon, and adapted to engage and operate the chain 37 previously mentioned.

Also mounted on the countershaft 44 intermediate the bearing member 46 and the geared head 43, is a one-revolution clutch 54 of generally conventional construction and so arranged that with the motor operating and thus rotating the shaft portion 55 extending outwardly from the geared head 43, and upon actuation of the said one-revolution clutch 54, the countershaft 44 will be caused to rotate through one revolution, and thus the sprocket 47 thereon likewise be caused to move through one revolution. In order to operate the single or one-revolution clutch 54, a solenoid unit 56 is provided having the usual operating parts therefor, whereby upon energization of the solenoid 56, the clutch 54 is operated by means of the linkage generally designated 57. The solenoid unit 56 is suitably mounted on a bracket 58 by bolts or in any other preferred manner, the bracket 58 in turn being supported and engaged with the lower supporting unit 2 in a similar manner.

In view of the arrangement just described, it is notable that actuation of the solenoid unit 56 and thus of the linkage 57 will cause the single revolution clutch 54 to in turn be operated and engage the shaft 44 for a single rotation. The single rotation of the shaft 44 and of the 12-tooth sprocket thereon will in turn effect rotation of the sprocket 49, the speed of the shaft 44 being in the order of 150 R. P. M. and thus transmit ⅕ of a revolution to the shaft 50. Additional explanation of the rotation of the various shafts will be referred to and the reasons for the relationships between the various sprockets mounted thereon will be understood during a description of the operation of the machine.

Referring now to Figures 1, 2 and 5, there is illustrated therein what is known in the art as a stickholder or confection-carrying device, generally designated 59, and preferably of conventional construction such as is shown in the patent of Anderson, No. 2,232,196, issued February 18, 1941. The said stickholder will only be generally described herein, and is so constructed as to have suitable handle members 60 and 61 at opposite ends of a body portion 62 by which the holder may be lifted and carried manually. The body portion 62 is equipped with a plurality of openings therein arranged in such a manner as shown in Figure 5, whereby to engage a plurality of sticks 63 to which are attached the confections 64 in accordance with conventional practice. The stickholder 59 is equipped with a gripping plate, slidable therein so as to engage and maintain the sticks 63 and the confections 64 thereon in proper aligned position, the gripping and releasing of the sticks 63 of the confection being accomplished by means of a U-shaped lever 65, which is pivoted to the body portion 62 of the stickholder 59, and adapted to reciprocate the plate of the stickholder which in conjunction with the body portion of the stickholder grips and releases the sticks as shown in the Anderson patent. Suitable manipulation of the lever 65 upwardly toward the adjacent handle 60 (see Figure 2) moves the plate of the stickholder in a manner to grip and maintain the sticks in connection therewith, and similarly downward movement of the lever 65 around its pivot point will cause a releasing of the sticks and of course the confections attached thereto as desired.

Referring now to Figure 1, stickholders 59 are shown in various positions A, B, and C with respect to the upper conveyor unit 7, stickholder 59 at the left in said figure having just been entered into the machine and being supported upon the supporting plates 32 and 33. It should be borne in mind that the lever 65 is in its upper position as shown in the said figure, and thus the sticks 63 and confections 64 thereon are maintained in their positions, depending below the stickholder itself, and in aligned position preferably as shown in Figure 2 in rows of six, the said rows of six being four in number. When the stickholder 59 at position A in Figure 1 has moved into the position B, laterally in the figure on the supporting plates, it will be apparent that the lever 65 has been depressed or rotated downwardly by means of the release member 41, as seen best in Figure 2, which release member abuts a side of the lever member 65 and thus confections supported in the stickholder 59 are all released simultaneously. It should be noted that the stickholder 59 is placed in position upon the supporting plates so as to extend across the machine for purposes which will be hereinafter set forth.

Referring now to Figures 1, 5 and 6, there is shown therein a conveyor belt unit which extends at right angles to the upper and lower conveyor units 6 and 7 of the machine of this invention, which conveyor belt unit generally is designated 66. The conveyor belt unit 66 may be of any conventional form, including a suitable wide flat flexible belt member 67, suitably mounted at its opposite ends upon rolls 68, the rolls 68 in turn being carried by suitable upright members 69, the upright members in turn supporting beneath the upper lap of the belt 67 a flat plate 70 by means of the brackets 71. The belt 67 of course may be driven in any conventional manner as by rotating one of the rolls 68 so as to provide an endless platform in accordance with known construction. This conveyor belt unit 66 is mounted so as to receive thereon the confections 64 when they are discharged from the discharge ends of the conveyor units 6 and 7 in a manner to be hereinafter set forth, and there is provided a photoelectric cell unit comprising a pair of photoelectric cells designated 72 and 73. As will be seen upon consideration of Figure 5, the photoelectric cells 72 and 73 are mounted so as to direct the light beam thereof at an angle across the conveyor belt 67, this arrangement being provided for control of the mechanism in a manner to be subsequently explained.

Since this machine has been particularly designed to avail of a well-known stickholder, it might be desirable to generally indicate certain of the requirements to be met by the machine by reason of the various dimensions of the stickholder and the confections adapted to be supported thereby. Generally speaking the stickholder 59 disclosed, includes provision for supporting a plurality of confections, extending from end to end in four rows of six therein, the four rows being spaced 1⅝ inches apart, and by reason of the provision of certain handling means upon the stickholder bodies, a distance through which a stickholder must move in accomplishing the unloading thereof in the machine herein, is five times 1⅝ inches or 8⅛ inches. As will be understood upon further explanation of the operation of the machine of this invention, movement of the stickholder through the machine to accomplish the unloading thereof, is accomplished in increments of 1⅝ inches and thus all of the various sprockets and chains and operating instrumentalities therefor are so arranged and designed as to accomplish such movement in increments as desired.

It is to be borne in mind that the stick holders or confection carrying devices are deposited on the supporting plates 32 and 33 at the left ends thereof as seen in Figure 1 by manual operation or under some conditions the stick holders with their supported confections may be fed to the members 32 and 33 by any suitable means so as to enter the machine at the left ends of the parts 32 and 33 above mentioned. Then when the machine is started into operation the pick up or engaging arms 30 and 31 of the upper conveyer unit 7 will properly engage the left hand side of the stick holder or confection carrying device 59 in order to start the movement of the same toward the right end of the unit 7. The operator pushes the stick holder until the arms 30 and 31 engage it. The handles 60 on the opposite ends of the confection carrying device or stick holder are a convenient means enabling the operator to grasp the same for supporting and carrying the holder to the machine.

Passing now to the discussion of the operation of the machine, it should be understood that initially the conveyor unit 66 is started into operation so as to cause the belt 67 thereof to be moved endlessly at the discharge ends of the conveyor units 6 and 7, and the photoelectric cell unit is started into operation and likewise the motor 42. Thus, the motor 42 causes the shaft 55 extending from the geared head 43 thereof to be rotated, and by reason of the provision of the photoelectric cell will permit the solenoid unit 56 to operate the single revolution clutch 54. This is of course understood to be the result of the fact that the light beam between the two cell units 72 and 73 is uninterrupted, and with the stickholder in the position A, will cause a movement of the upper conveyor chains 28 and 29 together with the arms 30 and 31 thereon. When the machine is first started, the light beam between the cells 72 and 73 being uninterrupted, will permit the solenoid 56 to maintain the single revolution clutch in clutching position, and effect the rotation of the shaft 44, and continued movement of the conveyor chains 28 and 29. Thus, when the arms 30 and 31 have abutted with the left hand edge or end of the stickholder 59 from the position A, and moved the same to the position designated B, one of the release members 40 or 41 will strike the lever 65 of the stickholder 59, and cause confections 64 supported thereby to be released from the stickholder, and drop downwardly. The lower conveyor unit 6 is also being operated simultaneously with the upper conveyor chains 28 and 29 being driven by sprockets and chains 17, 18, and 19, with the confection supporting members 16 therein being in substantial alignment with the confections in the four rows across the confection stickholder 59, to receive and thereafter support said confections thereon. It should be noted that the conveyor units 6 and 7 are spaced a distance apart which is not sufficient to permit the sticks 63 of the confections 64 in the position shown in Figure 1 and denoted B to entirely drop out of the openings in the stickholder 59, and thus the confections are maintained in an upright aligned position, supported on the members 16 and being guided in the stickholder 59 by loose engagement of the sticks 63 thereof with the openings in the bottom of the stickholder. During all of this time, of course, the light beam between the cells 72 and 73 has not been interrupted, and thus the single revolution clutch 54 is maintained in continuous connection so as to keep the conveyor units 6 and 7 in operation. Thus, when the stickholder reaches the position designated C, near the discharge ends of the conveyors 6 and 7, the said conveyor units are still in operating condition, and also it should be remembered that the endless belt 67 of the conveyor unit 66 is also moving. When the stickholder has reached the position C of Figure 1, subsequent movement to the right of said figure, causes one of the rows of six confections to be discharged out of the position between the respective conveyors 6 and 7, by reason of the disengagement of the sticks 63 thereof with the stickholder. Continued movement of the supporting members 16 upon which this particular row of six confections is supported, will cause said confections to move into the position shown in dotted lines in Figure 1, and to thereafter be deposited upon the surface of the belt of the conveyor 66 in a position as shown in Figure 5. This position as will be readily understood is at substantially right angles to the position which the confections occupied when passing through the machine, and at this point the light beam between the cells 72 and 73 is interrupted. This immediately causes a disengagement of the single revolution clutch 54, and thus the conveyor units 6 and 7 do not operate to discharge additional confections. When the conveyor belt 67 has caused the row of six confections previously deposited thereon as shown in Figure 5 to move into such a position that the light beam between the cells 72 and 73 is again completed, the single revolution clutch is therefore thus actuated for a single revolution of the shaft 44, and by reason of the arrangement of the respective sprockets and chains as previously referred to, will cause a movement of the stickholder in the position C of Figure 1, exactly 1⅝ inches toward the right, and thus permit the second row of confections to be released from their upright position between the respective conveyor units 6 and 7 and be deposited in turn upon the conveyor belt 67. This of course will then interrupt the light beam between the cells 72 and 73 to prevent any piling up of the confections in an undesirable manner. It will be understood that by reason of the movement of the stickholders, which will be constantly fed from the left-hand end of the machine as viewed in Figure 1, from the position A therein to the position C and of course removed from the position C by hand, or other means, there is continuous supply to the conveyor unit 66 of confections deposited thereon as shown in Figure 5. When the four rows of confections have been released and deposited on the conveyor unit 66 the space between the stickholders must be compensated for and thus the solenoid 56 operates the clutch 54 to cause a double movement of the stickholders, toward the right in Figure 1, and thus no perceptible time is lost in continuously depositing confections upon the conveyor unit 66. It should be noted that the stickholders 59, when they reach the position B of Figure 1, have been acted upon by the release members 40 or 41 as the case may be, depending upon which way the stickholder is inserted in the machine, so as to cause a release of the confections in this position. The confections are of course, as previously explained, thereafter largely supported upon the lower conveyor unit 6, being guided by the engagement of the sticks 63 of the confections remaining in their positions in the openings in the bottom of the stickholder, although not being gripped by the stickholder. It should be understood that the various electrical circuits and connections are not herein set forth, since they are clearly within the knowledge of any skilled electrician, and may be so arranged to provide safety controls or other known controls in accordance with the requirements of the particular place in which the machine is used.

It should also be noted that the arrangement of the respective conveyor units 6 and 7 with regard to their vertical and horizontal disposition may be varied in accordance with the requirements of the confections to be acted upon, the variations being largely of the length of the confection and the possible angle of discharge of the same from the end of the conveyor unit, although in this particular disclosure the said conveyor units 6 and 7 are shown as having their discharge ends in substantial vertical alignment. It will be clear that longitudinal variation of the discharge ends of the respective conveyors will in part affect the timing of the discharge of the confections, and also the manner in which the same drop to their positions upon the conveyor unit 66. It is desirable that said confections drop as shown in Figure 1 to positions at substantially right angles to those previously occupied, although this is not intended to be fixed except by the circumstances of use of the machine. Further reference might be made to the exact rotation or movements of the respective sprockets but it is felt that same will be clearly understood by reason of the explanation of the relationship thereof, and it will also be clear that variation of the same might be effected by reason of the provision of stickholders of different dimensions as the case may be. However, it should be clearly pointed out that the respective conveyor units 6 and 7 are intended to operate in unison or in timed relation, so as to provide movement through the machine of the confections in proper relationship, and subsequent deposit of groups of the confection from the discharge ends of the conveyors, to be thereafter carried off by a conveyor unit such as 66.

It should be understood that while a particular form of stickholder is referred to and confections are described as being supported and released therefrom, this invention contemplates the handling of other articles which are susceptible of manipulation in a similar manner whether the same be delivered to a wrapping machine or subsequently have other manufacturing operations performed thereon.

What I claim as new and desire to secure by Letters Patent of the United States is:

1. In a machine of the class described, in combination, a support, an upper conveyor unit mounted on said support, a lower conveyor unit mounted on said support beneath said first unit, and provided with confection supporting elements, means for operating said units in timed relation, a confection carrying device adapted to be supported on said upper unit and moved thereby, said device having releasable gripping means for maintaining confections in initial fixed positions, and a releasing member on said support to release confections from said device into positions of at least partial support by the supporting elements of the lower conveyor unit.

2. A machine as claimed in claim 1, wherein the upper conveyor unit includes a pair of endless chains having spaced arms thereon adapted to engage the confection carrying device, the releasable gripping means are formed so as to grip confections carried by said device, and the supporting elements comprise plate members mounted on a pair of endless chains of the lower unit.

3. A machine as claimed in claim 2, wherein the confection carrying device is adapted to support confections in rows, therebelow, and the upper and lower units are so spaced as to cause confections seated on the supporting elements of the lower unit to maintain guiding engagement with the confection carrying device of the upper unit during timed operation of the units.

4. In a machine of the class described in combination, a support, a confection carrying device movable on said support, a first conveying unit mounted on said support adapted to move said device from an entrance end to the discharge end thereof, said device having elements for releasably supporting a plurality of confections in depending positions, a second conveying and supporting unit having a discharge end and mounted on said support below said first unit and including confection supporting elements, a release member on the support for coaction with said carrying device to release confections therefrom onto the confection supporting elements aforesaid, and means for operating said units in timed relation.

5. A machine as claimed in claim 4, wherein the conveying units are spaced on the support a distance such that confections supported on the lower unit are at least partially guided by the carrying device during movement by said conveying units.

6. A machine as claimed in claim 5, wherein the discharge ends of the first and second units are arranged to facilitate discharge of confections therefrom at an angle with respect to the positions assumed when guided by the carrying device.

7. A machine as claimed in claim 4, wherein the said units are arranged for support of confections in a vertical position after release from the carrying device, and effect discharge of confections to a substantially horizontal position at the discharge end of said lower unit.

8. A machine as claimed in claim 4, wherein at least one of the conveying units is adjustable relative the support.

9. A machine as claimed in claim 4, wherein the means for operating the units in timed relation includes instrumentalities for effecting step-by-step movement of said units.

10. A machine as claimed in claim 4, combined with a third conveying unit adjacent to the second conveying unit and in which the second conveyor unit is movable to carry the confections from relatively vertical positions thereon to deposit same in horizontal positions on the third conveyor unit, and automatic means operable on depositing of the confections on the third conveying unit to discontinue operation of the first and second conveying units until the third conveyor has carried the confections deposited thereon a predetermined distance.

11. A machine as claimed in claim 4, combined with a third conveying unit adjacent to the second conveying unit, and in which the second conveying unit is movable to carry the confections from relatively vertical positions thereon to deposit same in horizontal positions on the third conveying unit, and automatic means operable on depositing of the confections on the third conveying unit to discontinue operation of the first and second conveying units until the third conveyor has carried the confections deposited thereon a predetermined distance, said automatic means comprising a photo-electric cell unit including spaced photo-electric cells for directing a light beam across the surface of the third conveying unit on which the confections are deposited, said beam being interruptible by the confections when first deposited on the third conveying unit, and the operating means for the first and second conveying units includes a control clutch coacting with the cell unit for stopping movement of said first and second conveying units when the light beam is interrupted, and reinstating such movement when the beam is restored after the confections have been conveyed from beam interrupting position on the third conveying unit.

EDWIN J. OTKEN.

References Cited in the file of this patent

UNITED STATES PATENTS

| Number | Name | Date |
|---|---|---|
| 2,490,381 | Shields | Dec. 6, 1949 |
| 2,617,543 | Fahey | Nov. 11, 1952 |

FOREIGN PATENTS

| Number | Country | Date |
|---|---|---|
| 61,702 | Denmark | Dec. 13, 1943 |